(12) United States Patent
Kitamura et al.

(10) Patent No.: US 8,310,697 B2
(45) Date of Patent: Nov. 13, 2012

(54) IMAGE PROCESSING SYSTEM, IMAGE PROCESSING APPARATUS AND CONTROL METHOD OF THE SAME, AND COMPUTER PROGRAM

(75) Inventors: Masahiro Kitamura, Osaka (JP); Mitsuzo Iwaki, Osaka (JP); Kenichi Takahashi, Sennan-gun (JP); Daisuke Sakiyama, Kawanishi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 968 days.

(21) Appl. No.: 12/033,067

(22) Filed: Feb. 19, 2008

(65) Prior Publication Data
US 2008/0204796 A1    Aug. 28, 2008

(30) Foreign Application Priority Data
Feb. 23, 2007    (JP) ................. 2007-043145

(51) Int. Cl.
*G06F 3/12* (2006.01)
*G06K 15/00* (2006.01)
*H04N 1/00* (2006.01)
(52) U.S. Cl. ................. 358/1.15; 358/1.13; 358/1.14; 358/1.16; 358/402; 358/403; 358/404
(58) Field of Classification Search .................. None
See application file for complete search history.

(56) References Cited

U.S. PATENT DOCUMENTS

| 5,784,664 | A | 7/1998 | Nakamura et al. | |
|---|---|---|---|---|
| 2003/0090697 | A1* | 5/2003 | Lester et al. | 358/1.14 |
| 2004/0190040 | A1* | 9/2004 | Fukao | 358/1.15 |
| 2005/0030580 | A1 | 2/2005 | Moroi | |
| 2006/0026434 | A1 | 2/2006 | Yoshida et al. | |
| 2007/0013942 | A1* | 1/2007 | Ozawa et al. | 358/1.15 |
| 2007/0013945 | A1* | 1/2007 | Yoshida et al. | 358/1.15 |

FOREIGN PATENT DOCUMENTS

| JP | 08-098038 | | 4/1996 |
|---|---|---|---|
| JP | 10-010935 | | 1/1998 |
| JP | 2003151031 | * | 5/2003 |
| JP | 2004-112715 A | | 4/2004 |
| JP | 2005-047264 | | 2/2005 |
| JP | 2005-268922 A | | 9/2005 |
| JP | 2006-035631 | | 2/2006 |

OTHER PUBLICATIONS

Kurematsu Masayuki; "Print Terminal"; JP Pub date May 2003; Machine translation in English of JP Pub No. 2003-151031.*
Decision to Grant a Patent in JP 2007-043145 dated Feb. 10, 2009, and an English Translation thereof.

* cited by examiner

*Primary Examiner* — Benny Q Tieu
*Assistant Examiner* — Haris Sabah
(74) *Attorney, Agent, or Firm* — Buchanan Ingersoll & Rooney PC

(57) ABSTRACT

An image processing apparatus includes a request information reception portion that receives a request to execute an image-related process relating to an image from another image processing apparatus and obtains limited functions information from another image processing apparatus relating to a right of a user that specified the request to use a function, a substitute allowance determining portion determining whether the user has the right to use the function necessary to execute the image-related process of the request, based on the obtained limited functions information, and a substitute process command portion controlling each portion of the image processing apparatus to execute the image-related process when it is determined that the user has the right, and not to execute that image-related process when it is determined that the user does not have such right.

19 Claims, 13 Drawing Sheets

(EXTERNAL NETWORK)

| USER ID | PASSWORD |
|---------|----------|
| U007 | *56y#$$ | — DTU
| U058 | 43%&11! | — DTU
| U124 | !!8?8$$ | — DTU
| U130 | 3222¥¥% | — DTU
| ⋮ | ⋮ |

FIG. 6

| USER ID | U007 | U058 | U124 | ... | GUEST |
|---|---|---|---|---|---|
| COLOR PRINTING | ALLOWED | ALLOWED | ALLOWED | ... | PROHIBITED |
| STAPLING | PROHIBITED | ALLOWED | PROHIBITED | ... | PROHIBITED |
| SCAN-TO-EMAIL | PROHIBITED | ALLOWED | ALLOWED | ... | PROHIBITED |
| SCAN-TO-SMB | ALLOWED | ALLOWED | ALLOWED | ... | ALLOWED |
| ... | ... | ... | ... | ... | |

201

DT1 — U007, DT1 — U058, DT1 — U124, DTG — GUEST

FIG. 7

| DT2 IMAGE PROCESSING APPARATUS 2A | DT2 IMAGE PROCESSING APPARATUS 2B | DT2 IMAGE PROCESSING APPARATUS 2C | ... |
|---|---|---|---|
| COLOR PRINTING | COLOR PRINTING | SCAN-TO-EMAIL | ... |
| STAPLING | SCAN-TO-FTP | SCAN-TO-FTP | ... |
| SCAN-TO-EMAIL | SCAN-TO-SMB | G3-FAX | ... |
| ... | PRINT TO A3 SIZE | PRINT TO A3 SIZE | ... |

COPYING IS NOT POSSIBLE BECAUSE A3 PAPER IS OUT.
SELECT THE APPARATUS TO SUBSTITUTE TO COPY,
FROM THE LIST BELOW, THEN CLICK OK.

| IMAGE PROCESSING APPARATUS 2B |
| IMAGE PROCESSING APPARATUS 2E |
| IMAGE PROCESSING APPARATUS 2H |
| ⋮ |

CANCEL    OK

FAX SENDING FUNCTION IS NOT AVAILABLE.
YOU CAN SELECT A SUBSTITUTE TO SEND THE FAX
TO IMAGE PROCESSING APPARATUS 2C.
TO USE A SUBSTITUTE, SELECT THE FAX NUMBER
FROM THE LIST BELOW, AND PRESS OK.

| 06-1111-**** |
|---|
| 03-2222-**** |
| 072-3333-**** |
| ⋮ |

DTF

[CANCEL] [OK]

HG2

IMAGE PROCESSING SYSTEM, IMAGE PROCESSING APPARATUS AND CONTROL METHOD OF THE SAME, AND COMPUTER PROGRAM

This application is based on Japanese patent application No. 2007-043145 filed on Feb. 23, 2007, the contents of which are hereby incorporated by reference.

BACKGROUND OF THE INVENTION

1. Field of the Invention

The present invention relates to an image processing apparatus such as MFPs that executes image related processes.

2. Description of the Related Art

Image processing apparatuses, known as Multi-Function Peripherals (MFPs), provided with various functions such as copying, scanning, faxing and the like, are widely used in business offices or the like.

In recent years, network functions have been provided on these image processing apparatuses. In relation to that, it is possible for image processing apparatuses provided in the same network to mutually utilize each other's functions.

Ordinarily, a user operates an image processing apparatus to which he/she is registered as a user to utilize the functions provided on that particular image processing apparatus. However, if a problem occurs on that image processing apparatus, the user may be unable to utilize his/her desired functions. In such cases, the user may utilize the functions provided at an image processing apparatus to which he/she is not registered as a user.

Restrictions relating to the use of functions for each user registered to that apparatus are set at each of the image processing apparatuses to control security. Also, guest accounts may be registered at each image processing apparatus for unregistered users. Restrictions relating to the use of the functions are also set for these guest accounts. However, from the standpoints of security, these guest account restrictions are ordinarily stricter than the restrictions applied to the registered users.

If a user wishes to use the functions provided on an image processing apparatus to which he/she is not registered, the restrictions relating to the use of the functions by a guest account registered to that image processing apparatus will apply to that unregistered user.

As a method for setting restrictions relating to the use of the functions provided at an image processing apparatus, methods as described in Japanese Unexamined Patent Publications Nos. 2004-112715 and 2005-268922 have been proposed.

According to the method described in the first publication, provision permitted function information and connection permitted equipment information are provided to the image forming apparatus on the output side; by checking whether an image forming apparatus that requests to connect is registered in the connection permitted equipment information and whether the functions that are requested to be processed are registered in the provision permitted function information, only the functions on the output side image forming apparatus allowed by the output side image forming apparatus are available to the image forming apparatus on the input side which is allowed to connect by the apparatus on the output side.

According to the method disclosed in the second publication, if it is registered in a destination direct input prohibiting setting means to prohibit the use of a destination direct input means, an input operation of the destination direct input means is prohibited, while a destination input operation that references the telephone directory means is allowed.

If restrictions relating to the use of functions relating to a guest account set in an image processing apparatus are applied to a user not registered to that image processing apparatus, the user will encounter the following inconveniences. The user cannot use the functions at the image processing apparatus to which he/she is not registered as a user, even when those functions are available at the image processing apparatus to which he/she is registered.

It is conceivably possible to register all of the individual users and to set restrictions relating to the use of the functions for each user at each of the image processing apparatuses within the same network.

However, if this method is practiced, each time there comes a new user, the new user must be registered to each image processing apparatus, and restrictions relating to the use of the functions must be set in each one of the image processing apparatuses. For that reason, the number of management man-hours of an administrator of the image processing apparatus will also increase.

Furthermore, it is rare that any one user uses each and every one of the image processing apparatuses. Particularly, such situation is rarer when the network will increase in size and the number of image processing apparatuses increases. Therefore, it is inefficient to register all of the individual users and to set restrictions relating to the use of functions for each user, at each of the image processing apparatuses within the same network.

However, these problems cannot be solved by applying the methods proposed in the first or second publication.

SUMMARY OF THE INVENTION

In view of the foregoing problems, an object of an embodiment of the present invention is to improve the convenience of image processing apparatus use for users while maintaining image processing apparatus security without increasing the number of management man-hours of an administrator.

According to one aspect of the present invention, an image processing system includes a first image processing apparatus and a second image processing apparatus each of which has a function to execute an image-related process relating to an image. The first image processing apparatus includes a memory device that stores usage right information of each user relating to a right to use the function of the first image processing apparatus, and a request portion that makes a request to the second image processing apparatus to execute the image-related process specified by a user whose usage right information is stored on the memory device. The second image processing apparatus includes a receiver that receives the request, an acquisition portion that acquires from the first image processing apparatus that is a requester the usage right information of the user relating to the request received by the receiver, a determining portion that determines whether the user relating to the request has a usage right of the function necessary to execute the image-related process concerning the request based on the acquired usage right information, and a controller that controls each portion of the second image processing apparatus to execute the image-related process when it is determined by the determining portion that the user concerning the request has a right to use the function necessary to execute the image-related process, and not to execute the image-related process when it is determined that the user has no such right.

Preferably, the controller of the second image processing apparatus may control whether to execute a process relating to sending data to a device outside of a network including the first image processing apparatus and the second image processing apparatus following an arrangement of the second image processing apparatus relating to sending data to outside when the request received by the receiver is to execute the process.

The controller of the second image processing apparatus may control whether to execute the image-related process concerning the request following an arrangement of the second image processing apparatus when it is not possible to charge the user relating to the request received by the receiver for a usage fee for the image-related process concerning the request.

The structure described above improves the convenience of image processing apparatus use for users while maintaining image processing apparatus security without increasing the number of management man-hours of an administrator.

These and other characteristics and objects of the present invention will become more apparent by the following descriptions of preferred embodiments with reference to drawings.

BRIEF DESCRIPTION OF THE DRAWINGS

FIG. 5 is a diagram showing an example of a user account information memory portion.

FIG. 6 is a diagram showing an example of a restricted functions information memory portion.

FIG. 7 is a diagram showing an example of a shared functions information memory portion.

FIG. 9 is a diagram showing an example of a requested selection screen.

FIG. 13 is a diagram showing an example of a destination selection screen.

DESCRIPTION OF THE PREFERRED EMBODIMENTS

Figure 1:
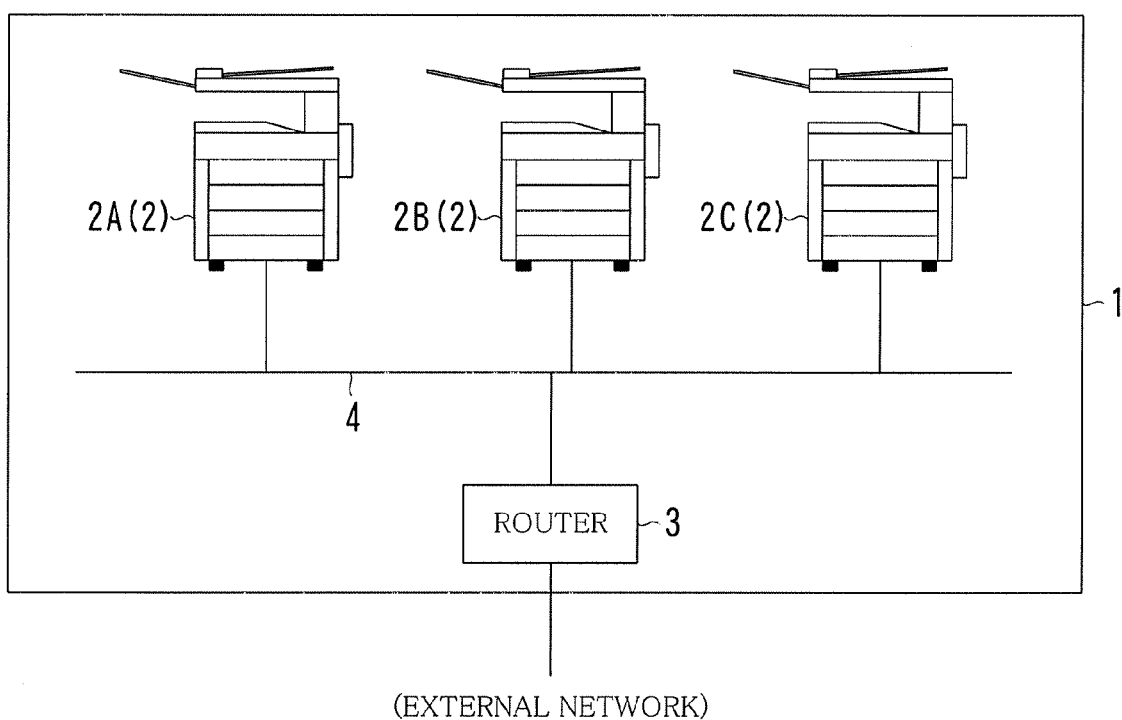
FIG. 1 is a diagram showing an example of an overall configuration of a network system.

As shown in FIG. 1, a network system 1 includes a plurality of image processing apparatuses 2A, 2B, 2C, and the like, a router 3, and a communication line 4. The network system 1 is established in an organization such as a public office, company or school, and the like. The network system 1 can be a small area such as that used by a LAN, or a large network, such as a so-called Virtual Private Network (VPN) that combines a plurality of LANs at mutually separate locations (for example a LAN for each of the business offices of a Tokyo office, a New York office and a London office).

A unique IP address and a unique MAC address are assigned to each of the image processing apparatuses 2A, 2B, 2C and the like and the router 3.

The image processing apparatuses 2A, 2B, 2C and the like are mutually connected via the communication line 4, and are able to exchange data based on protocols such as the so-called File Transfer Protocol (FTP) or Server Message Block (SMB). Furthermore, the image processing apparatuses 2A, 2B, 2C and the like can exchange data by connecting to devices of an external network via the router 3. Hereinafter, the image processing apparatuses 2A, 2B, 2C and the like are collectively referred to as the "image processing apparatus 2".

The image processing apparatus 2 is an image processing apparatus according to the present invention. The image processing apparatus 2 is a processing apparatus that aggregates various functions such as copying, scanning, faxing, scan-to-SMB, scan-to-FTP, and box. Generally, the image processing apparatus 2 is sometimes called Multi Function Peripherals (MFPs).

The "Scan-to-FTP function" converts images read by scanning a printed original into image data, and then transfers that image data to a user-specified device via the FTP protocol.

The "Scan-to-SMB function" converts images read by scanning a printed original into image data, and then transfers that image data to a user-specified device via the SMB protocol.

The "box function" provides each user with a personal box that is a storage area equivalent to a folder or directory on a PC, thereby allowing the user to save document data, such as image files and the like, to his/her own personal box.

Figure 2:
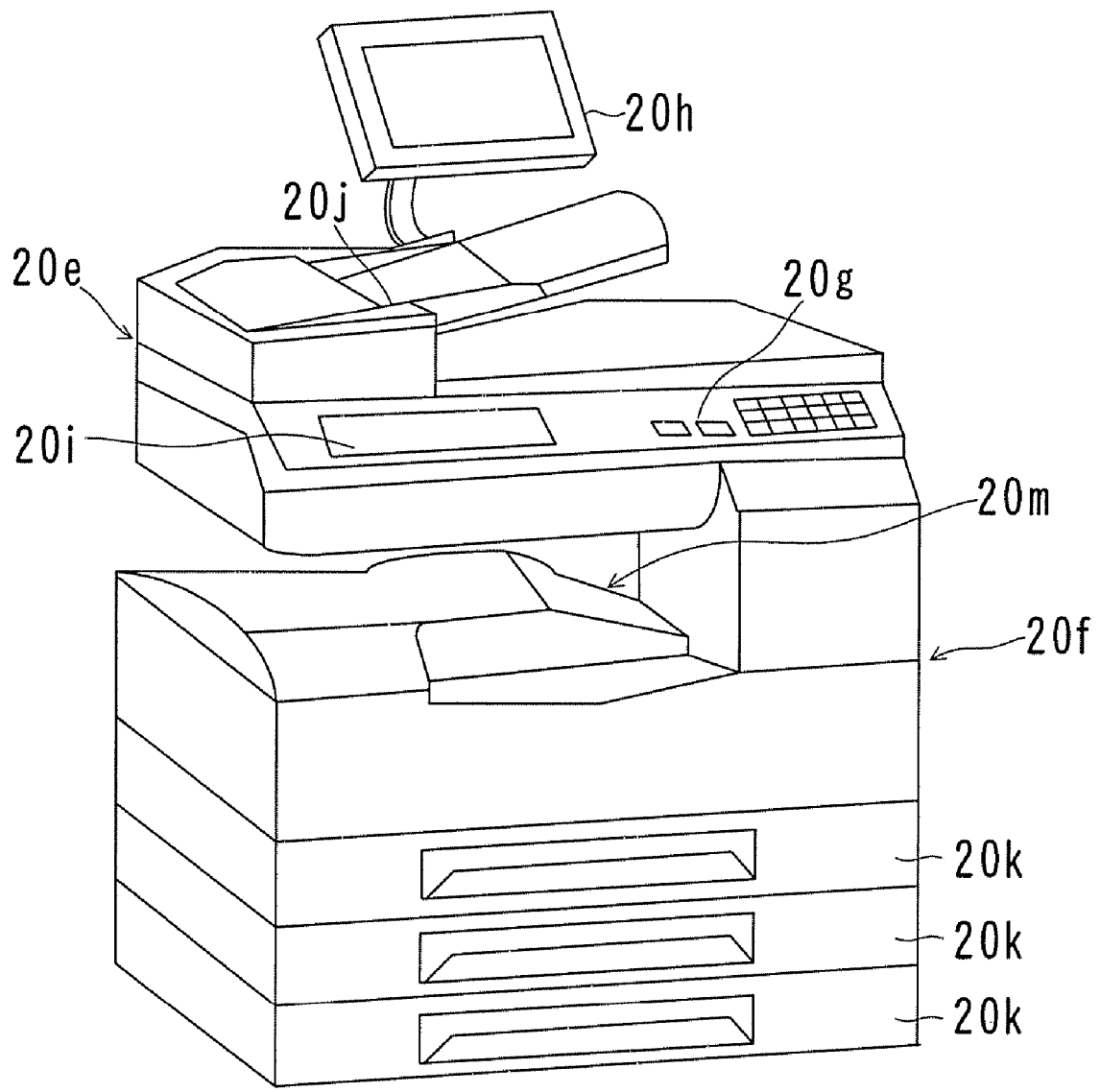
FIG. 2 is a diagram showing an example of an external view of an image processing apparatus.
Figure 3:
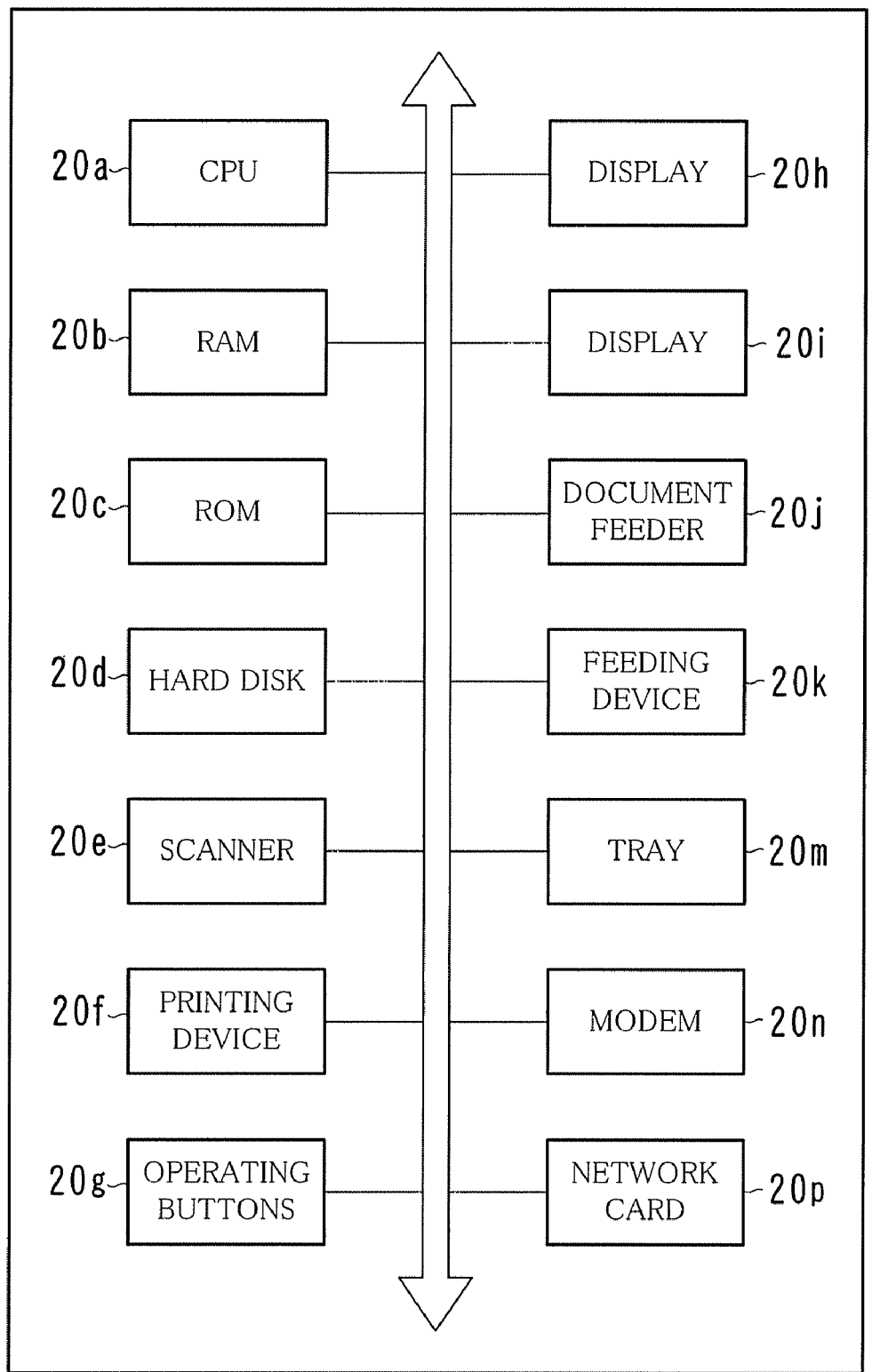
FIG. 3 is a diagram showing an example of a hardware configuration of an image processing apparatus.

As shown in FIGS. 2 and 3, the image processing apparatus 2 includes a CPU 20a, a RAM 20b, a ROM 20c, a hard disk 20d, a scanner 20e, a printing device 20f, operating buttons 20g, displays 20h and 20i, a document feeder 20j, a feeding device 20k, a tray 20m, a modem 20n, and a network card 20p.

The operating buttons 20g include a plurality of buttons (keys) for inputting letters, numbers, symbols and the like, and sensors that recognize the touched buttons to transmit that to the CPU 20a.

The displays 20h and 20i display screens that present messages or instructions to the user; that allow the user to input setting details and process details, and that show images formed by the scanner 20e and indicate the results of CPU 20a processes. This embodiment adopts touch panel displays for the displays 20h and 20i. Therefore, the displays 20h and 20i are equipped with functions that detect the positions where the user has touched with his/her finger, and that transfer the signals indicating the detection results to the CPU 20a.

In this way, the operating buttons 20g and the displays 20h and 20i have the role in a user interface for the user to directly operate the image processing apparatus 2.

The scanner 20e optically reads images such as photographs, characters, pictures or diagrams and the like drawn on an original to generate digital image data. Image data obtained in this way is used in printing at the printing device 20f. Or, such data can be converted into a file format such as Tagged Image File Format (TIFF) or a Portable Document Format (PDF) and either saved in the hard disk 20d or sent to another device. The document feeder 20j is used to sequentially feed one or a plurality of paper originals to the scanner 20e.

The printing device 20f prints images read by the scanner 20e or the like onto recording sheets such as paper or film. The feeding device 20k is used to supply the proper recording sheet for the image targeted for printing to the printing device 20f. The recording sheet printed with the image by the printing device 20f, i.e., a printed document is discharged to the tray 20m.

The network card 20p is a Network Interface Card (NIC) that performs so-called IP communications based on TCP/IP with another image processing apparatus 2 or an external device of the network system 1 as the other party.

The modem 20n is an interface that performs image data transmission with a fax terminal using fax protocol via a public phone line.

Figure 4:
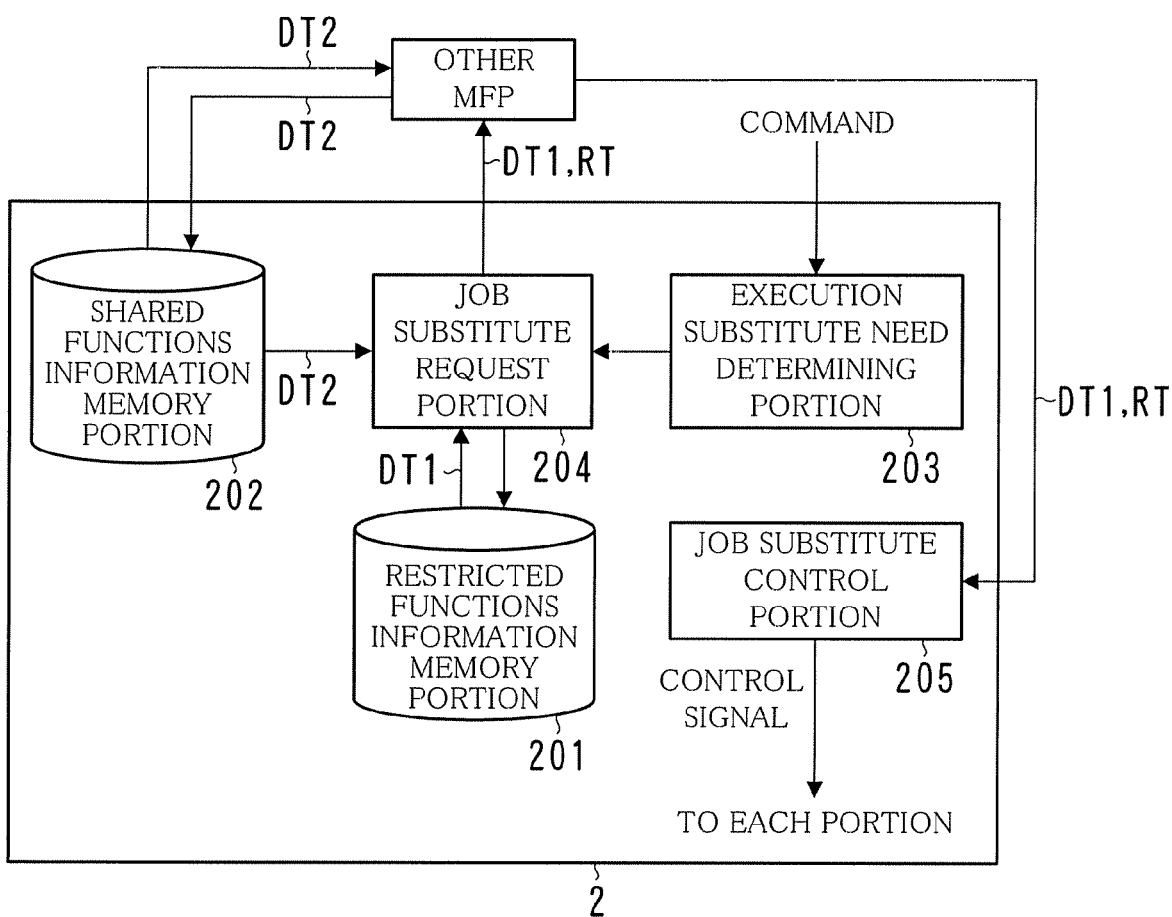
FIG. 4 is a diagram showing an example of a functional configuration of an image processing apparatus.

As shown in FIG. 4, a program and data are stored in the ROM 20c or the hard disk 20d to implement a restricted functions information memory portion 201, a shared functions information memory portion 202, an execution substitute need determining portion 203, a job substitute request portion 204, and a job substitute control portion 205. As required, the program and data are read to the RAM 20b, and then, the program is executed by the CPU 20a.

Furthermore, a region used for personal box for each user is provided in the hard disk 20d. As described above, the personal box saves document data such as image files.

A user can use not only functions provided on the image processing apparatus 2 to which he/she has logged on, but also the functions of other image forming apparatuses 2.

For example, suppose that A3 size paper is out on the image processing apparatus 2A to which the user has logged on, and he/she will not be able to copy to A3 size paper. In such case, the user can use the copy function to copy to A3 size paper provided at another image processing apparatus 2 such as the image processing apparatus 2B. Also, if the image processing apparatus 2A is not installed with a fax sending function, the user can use the fax sending function provided at another image processing apparatus 2.

In this way, the functions provided at an image processing apparatus 2 can be shared by a user having logged on to that image processing apparatus 2, and by users logged on to other image processing apparatuses 2.

Also, the user is registered to at least one image processing apparatus 2 of the network system 1. A user account information memory portion 206 is provided in the hard disk 20d of the image processing apparatus 2. As shown in FIG. 5, user account information DTU that indicates a user ID and a password, for each user registered in that image processing apparatus 2, is registered in the user account information memory portion 206.

Ordinarily, the user is registered to the image processing apparatus 2 that he/she primarily uses. Hereinafter, the image processing apparatus 2 to which the user is registered is described as the "home MFP" from the user's standpoint. Furthermore, the user that is registered to the image processing apparatus 2, i.e., the home MFP is described as the "home user" from that image processing apparatus 2's standpoint. One user can use a plurality of image processing apparatuses 2 as home MFPs. In such cases, user account information DTIJ for the user is registered at each of the home MFPs.

Each portion of the image processing apparatus 2 shown in FIG. 4 performs processes to allow a user logged on to another image processing apparatus 2 to use the functions provided on that image processing apparatus 2, or processes to allow a user logged on to that image processing apparatus 2 to use functions provided on another image processing apparatus 2. The functions of each portion of the image processing apparatus 2 shown in FIG. 4 will now be described in detail.

Referring to FIG. 4, restricted functions information DT1 is stored in the restricted functions information memory portion 201 of the image processing apparatus 2 for each user registered in that image processing apparatus 2, i.e., for each home user as shown in FIG. 6. User IDs and allowance/prohibition of functions are indicated in the restricted functions information DT1.

Furthermore, the restricted functions information memory portion 201 stores guest restricted functions information DTG that is used for applying to a user restrictions relating to the use of functions when a user who does not use that image processing apparatus 2 as the home MFP, but has logged on to that image processing apparatus 2 as a guest user (sometimes referred to as a public user).

The content of the restricted functions information DT1 is set by an administrator of the image processing apparatus 2 according to each home user's position, duties, knowledge or the like. The content of the guest restricted functions information DTG is set by the administrator of the image processing apparatus 2 according to a security policy of the image processing apparatus 2 or to a budget for its operation. Normally, stricter restrictions are implemented for guest users than home users. This is the same for this embodiment. Therefore, stricter restrictions than those applied to the home user are set in the guest restricted functions information DTG.

As shown in FIG. 7, shared functions information DT2 is stored in the shared functions information memory portion 202 for each of the image processing apparatus 2 and other image processing apparatuses 2. The shared functions information DT2 indicates, among the functions provided at the image processing apparatus 2 relating to the shared functions information DT2, which functions are allowed to be shared and can currently be used.

As for the shared functions information DT2 stored in the shared functions information memory portion 202, the content of the shared functions information DT2 that the image processing apparatus 2 itself has can be obtained, if an inquiry is made to an operating system of the image processing apparatus 2 about the functions which are already set by the administrator to be shared and currently available.

Also, each shared functions information DT2 is distributed between the image processing apparatuses 2 existing on the network system 1. In this way, the shared functions information DT2 of all image processing apparatuses 2 is stored in the shared functions information memory portion 202 at each image processing apparatus 2. The timing of distribution may be when the contents of the shared functions information DT2 of the image processing apparatus 2 itself is updated or when a request is made from another image processing apparatus 2.

The execution substitute need determining portion 203 determines whether it is necessary to have another image processing apparatus 2 act for a job specified by a user logged on to the image processing apparatus 2 including the execution substitute need determining portion 203.

Specifically, the execution substitute need determining portion 203 determines that it is necessary to substitute an apparatus when the function required to execute the user-specified job is not provided on the image processing apparatus 2, or when that function currently cannot be used even if being provided.

For example, if a user orders to copy an original image onto A3 size paper, but that image processing apparatus 2 is not provided with the function that prints to A3 size paper, the execution substitute need determining portion 203 determines that a substitute apparatus is necessary. Or, if the function is provided but the A3 size paper is out, the execution substitute need determining portion 203 determines that it is necessary to substitute an apparatus to act for the job.

Or, if a user orders to send an original image by fax but the image processing apparatus 2 does not have a fax sending function, the execution substitute need determining portion 203 determines that a substitute apparatus is necessary. Or, it determines that it is necessary to substitute an apparatus to act for the job, if the fax sending function is provided, but the fax sending function cannot be used because the line is not in service or the modem 20n is being used.

Hereinafter, a function that is either not provided on the image processing apparatus 2 or is provided thereon but currently not usable although it is necessary to execute a job specified by a user is described as a "deficient function".

Figure 8:
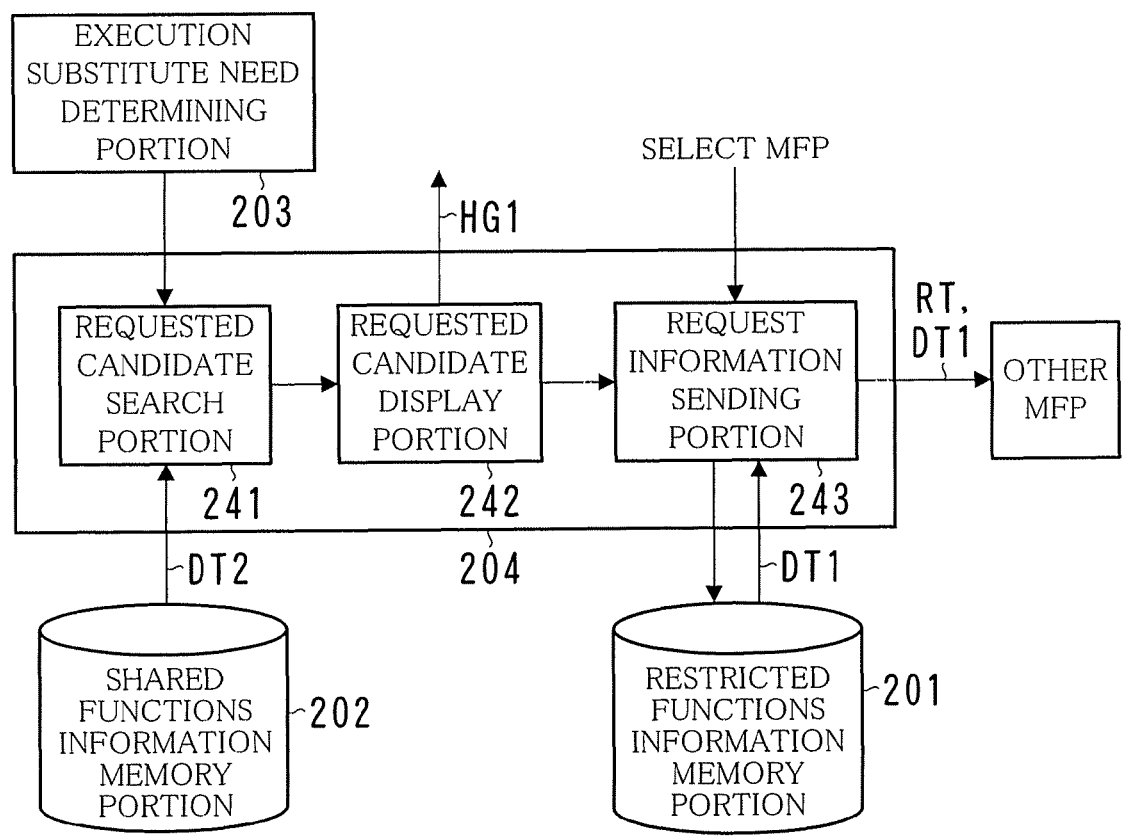
FIG. 8 is a diagram showing an example of a configuration of a job substitution request portion.

As shown in FIG. 8, the job substitute request portion 204 includes a requested candidate search portion 241, a requested candidate display portion 242, and a request information sending portion 243. With this configuration, in the event that the execution substitute need determining portion 203 determines that it is necessary to have another image processing apparatus 2 act for that user-specified job, the job substitute request portion 204 requests any of the other image processing apparatuses 2 to act for that job.

The requested candidate search portion 241 searches other image processing apparatuses 2 that share the deficient function and currently allow its use, based on each piece of shared functions information DT2 (see FIG. 7) stored in the shared functions information memory portion 202.

For example, if the user-specified job is a job to copy an original image using color on A3 size paper, the requested candidate search portion 241 searches for an image processing apparatus 2 having the shared functions information DT2 that indicates both of the functions of printing to A3 size paper (A3 size printing) and printing in color. The result is that the image processing apparatus 2B, in the example of FIG. 7, is found. If the user-specified job is a job to send a fax using the G3 protocol, the requested candidate search portion 241 searches for an image processing apparatus 2 that has the shared functions information DT2 indicating the G3 faxing function. The result is that the image processing apparatus 2C, in the example of FIG. 7, is found.

As shown in FIG. 9, the requested candidate display portion 242 displays a requested selection screen HG1 on the display 20h or the display 20i, which shows a message notifying that the user-specified job cannot be executed, and a list of candidates of requested device that can act for that job, in other words, other image processing apparatuses 2 found by the requested candidate search portion 241.

The user can then select one image processing apparatus 2 from the list to substitute for the user-specified job, and touch the "OK" button.

When this happens, the request information sending portion 243 sends the data necessary to execute the user-specified job as request information RT to the image processing apparatus 2 selected on the requested selection screen HG1.

For example, if the job is to copy, data indicating the image data of the original image read by the scanner 20e and the copying conditions (paper size, number of copies, whether to use color or B/W, and whether to copy in simplex or duplex) is sent as the request information RT. Or, if the job is to send a fax, data indicating the image data of the original image read by the scanner 20e and the destination of the fax transmission is sent as the request information RT.

Also, the request information sending portion 243 calls up the restricted functions information DT1 of the user from the restricted functions information memory portion 201 (see FIG. 6) and sends the restricted functions information DT1 along with the request information RT.

With these processes, the request of substituting another image processing apparatus 2 to act for the user-specified job is completed.

Figure 10:
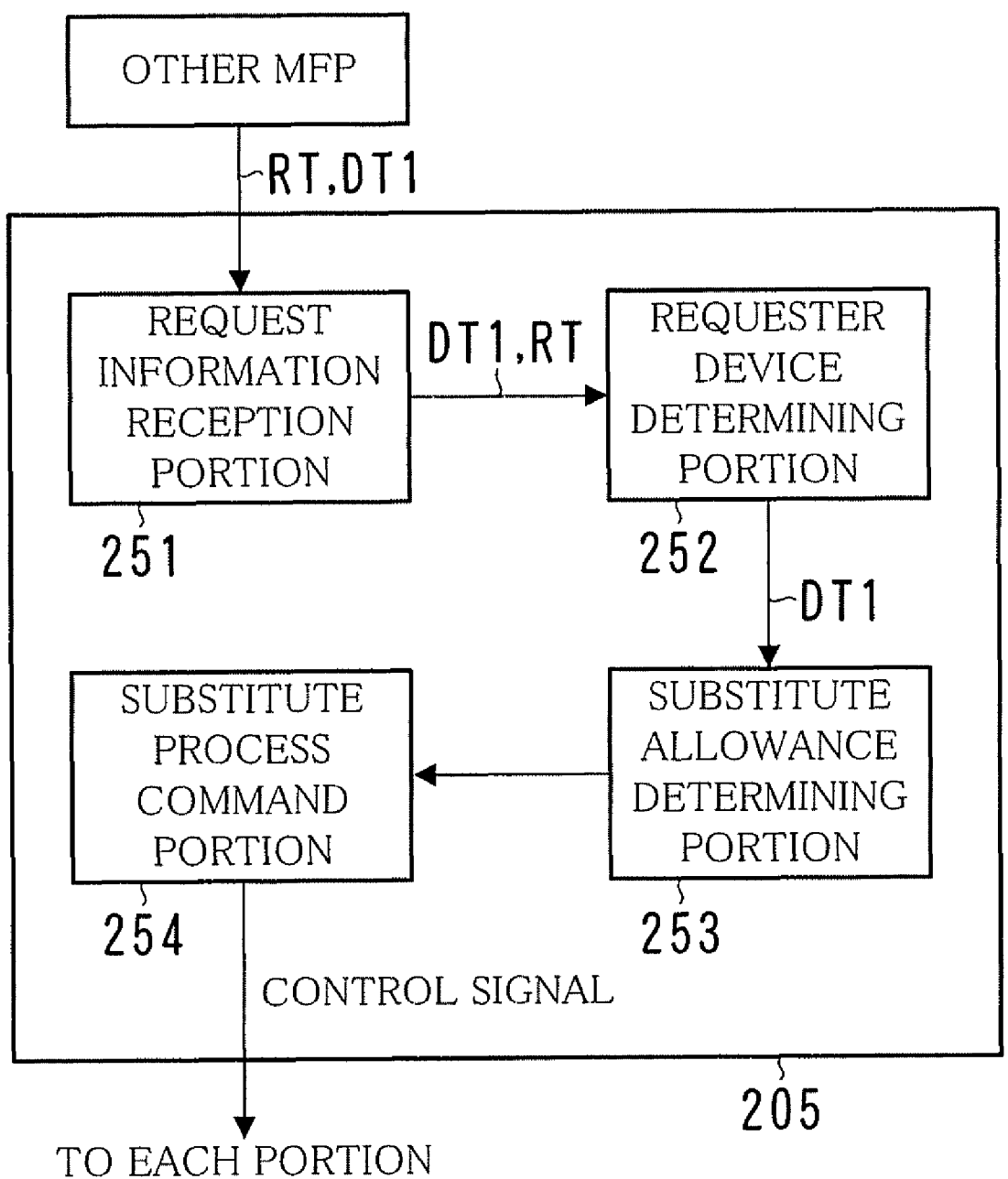
FIG. 10 is a diagram showing an example of a configuration of a job substitution control portion.

The job substitute control portion 205 shown in FIG. 4 includes a request information reception portion 251, a requester device determining portion 252, a substitute allowance determining portion 253, and a substitute process command portion 254 as shown in FIG. 10. With this configuration, controls are implemented to act for a job requested by another image processing apparatus 2.

The request information reception portion 251 receives the request information RT and the restricted functions information DT1 from another image processing apparatus 2.

The requester device determining portion 252 determines whether the sender or an apparatus of a requesting user of the request information RT received by the request information reception portion 251 belongs to the network system 1. It can be determined whether the apparatus belongs to the network system 1 by confirming the packet sender's address (the sender's IP address or MAC address) in the request information RT or the restricted functions information DT1.

The substitute allowance determining portion 253 determines whether it is acceptable to execute a job indicated by the request information RT, in other words a job requested to be executed by a substitute apparatus, based on the results of the determination of the requester device determining portion 252, the contents of the restricted functions information DT1 received along with the request information RT, and the following Rule A, Rule B and Rule C.

Rule A: In practice, it is determined acceptable to execute a job if the restricted functions information DT1 indicates that the function necessary to execute that job indicated by the request information RT is "allowed." If a plurality of functions is required, each of these must be indicated to be "allowed."

Rule B: If it is determined by the requester device determining portion 252 that the device of the requesting user does not belong to the network system 1, it is determined that that job cannot be executed, regardless of whether the conditions of Rule A are satisfied.

Rule C: If the job is to send data to a device outside of the network system 1, allowance is based on an agreement relating to sending data to outside of the image processing apparatus 2 itself, even if the conditions of Rule A has been satisfied. For example, if there is an agreement that the sending of data only to a destination registered in the address book or telephone directory of the image processing apparatus 2 is allowed, then that will be followed. Specifically, if the destination is an address or a fax number that is not registered in the address book or telephone directory (in other words, it is a direct input), it is determined that that job cannot be executed, regardless of whether that job satisfies the conditions of Rule A.

The substitute process command portion 254 controls each portion of the image processing apparatus 2 to execute the job, if it is determined by the substitute allowance determining portion 253 that the job indicated by the request information RT may be executed. Thus, the job is executed by the associated portions.

In this way, one image processing apparatus 2 acts to execute a job requested from other image processing apparatus 2. Specifically, an image processing apparatus 2 provides its own functions in this way to other image processing apparatus 2 where there are deficient functions.

Note that if the job requested to the image processing apparatus 2 is to send data to a device outside of the network system 1, it can be determined whether it is acceptable to act for that job, based on the restricted functions information DT1 or the guest restricted functions information DTG of a user managed by the image processing apparatus 2, instead of the restricted functions information DT1 obtained from the requester.

The overall flow of processes will now be explained when an image processing apparatus 2 receives instructions to execute a job from a user and the apparatus 2 requests other image processing apparatus 2 to act for the job. Here, an example will be used to explain the overall process with reference to FIG. 11, where a user X who uses only an image processing apparatus 2A as the home MFP gives instructions to the image processing apparatus 2A to execute a job to color copy on A3 size sheet; that process cannot be executed because A3 paper is out on the image processing apparatus 2A; and then, the image processing apparatus 2B substitutes for the image processing apparatus 2A to act for that job.

The user X enters his/her user ID and password to the image processing apparatus 2A. When the image processing apparatus 2A receives the user ID and password (#501 in FIG. 11), the user ID and password are compared to the user account information DTU stored in the user account information memory portion 206 to perform user authentication (#502). Specifically, it is determined whether a user ID and password of any of the user account information DTU stored in the user account information memory portion 206 and the received user ID and password match. If they match, the user X can log on to the image processing apparatus 2A (#503).

When the image processing apparatus 2A receives the job to color copy an original image onto an A3 size sheet (#504), it checks whether that function for executing the job is currently usable on itself (#505).

Then, if the apparatus 2A has detected that there is not enough A3 size paper, in other words, that the function to print to A3 size paper cannot currently be used (#506), it searches for another image processing apparatus 2 (#507) that shares the function and currently can provide the function. Then, it displays the requested selection screen HG1 (see FIG. 9) that has a message that there is insufficient paper of the desired size, and provides a list of searched image processing apparatuses 2 (#508).

Here, suppose that the user X selects the image processing apparatus 2B as the image processing apparatus 2 to act for the job.

When this occurs, the image processing apparatus 2A sends image data obtained by scanning the original, and data indicating the copying conditions as the request information RT to the image processing apparatus 2B to request the image processing apparatus 2B to act for the job (#509 and #510). Specifically, the image processing apparatus 2A requests the image processing apparatus 2B to perform a so-called push-print job. Also, the image processing apparatus 2A sends the user X's restricted functions information DT1 (see FIG. 6) along with the request information RT to the image processing apparatus 2B.

The image processing apparatus 2B confirms that the sender belongs to the network system 1 when the request information RT and the restricted functions information DT1 are received (#551), and determines whether it is allowed to execute (substitute an apparatus for) the job for the user X, based on the content of the restricted functions information DT1 and Rule A to Rule C explained above (#552).

If the job is not to send data to a device outside of the network system 1, it is not necessary to check whether Rule C has been satisfied. Also, if a request is allowed from a device that does not belong to the network system 1 (an external device), or if the image processing apparatus 2B is configured not to accept requests from external devices by the use of a firewall, or the like, it is not necessary to check whether Rule B has been satisfied.

If it is determined that a substitute is allowed, that job is executed (#553). Then, the execution results (whether the job was executed or failed) are sent to the image processing apparatus 2A (#554).

When the image processing apparatus 2A receives the execution result of the job from the image processing apparatus 2B (#511), it displays the result for the user X (#512).

Note that the image processing apparatus 2A will execute the job by itself if it does not detect any deficient function at step #505 (in other words, if it has all the necessary functions and they are usable). Also, if no other image processing apparatus 2 that can substitute is found at step #507, a message is displayed that the job cannot be executed and the job is canceled.

Still further, if it is determined at step #552 that the job should not be executed, the image processing apparatus 2B rejects the request to act for that job and returns a message of rejection of the request to the image processing apparatus 2A. This message is displayed on the image processing apparatus 2A.

The image processing apparatus 2B determines at step #552 whether to accept or reject an apparatus substitution for the job, but it is also acceptable for the image processing apparatus 2A that is the requester to make that determination.

Also, prior to requesting, the image processing apparatus 2A confirms whether the user X has usage rights to the necessary functions. If affirmative, it is acceptable for the image processing apparatus 2A to request to the image processing apparatus 2B. It is also possible for the image processing apparatus 2B to determine whether other conditions (such as that the requester belongs to the network system 1, and conditions indicated in unique agreement of the image processing apparatus 2B itself) are satisfied. If they are satisfied, the job will be executed.

According to this embodiment, even when the user causes another image processing apparatus 2 to execute a job instead of the image processing apparatus 2 to which he/she is logged on, it is possible to use the functions provided on that other image processing apparatus 2 based on the setting for restrictions relating to use of the functions on that image processing apparatus 2. This improves the convenience of image processing apparatuses for the user. Specifically, the user can cause an image processing apparatus 2 that is not the home MFP to execute a job within the range of restrictions set on the image processing apparatus 2 that is the home MFP.

Moreover, the restricted functions information DT1 that indicates the settings of those restrictions is provided from the requester image processing apparatus 2 to the requested image processing apparatus 2. Therefore, the administrator does not need to go to all the trouble of having to register the restricted functions information DT1 to the image processing apparatus 2 that the administrator controls for those who are not home users. This makes it possible to improve the convenience of the image processing apparatuses for the users without increasing the number of hours associated to management by the administrator, and without having the administrator consider the existence of users who are not home users.

Figure 12:
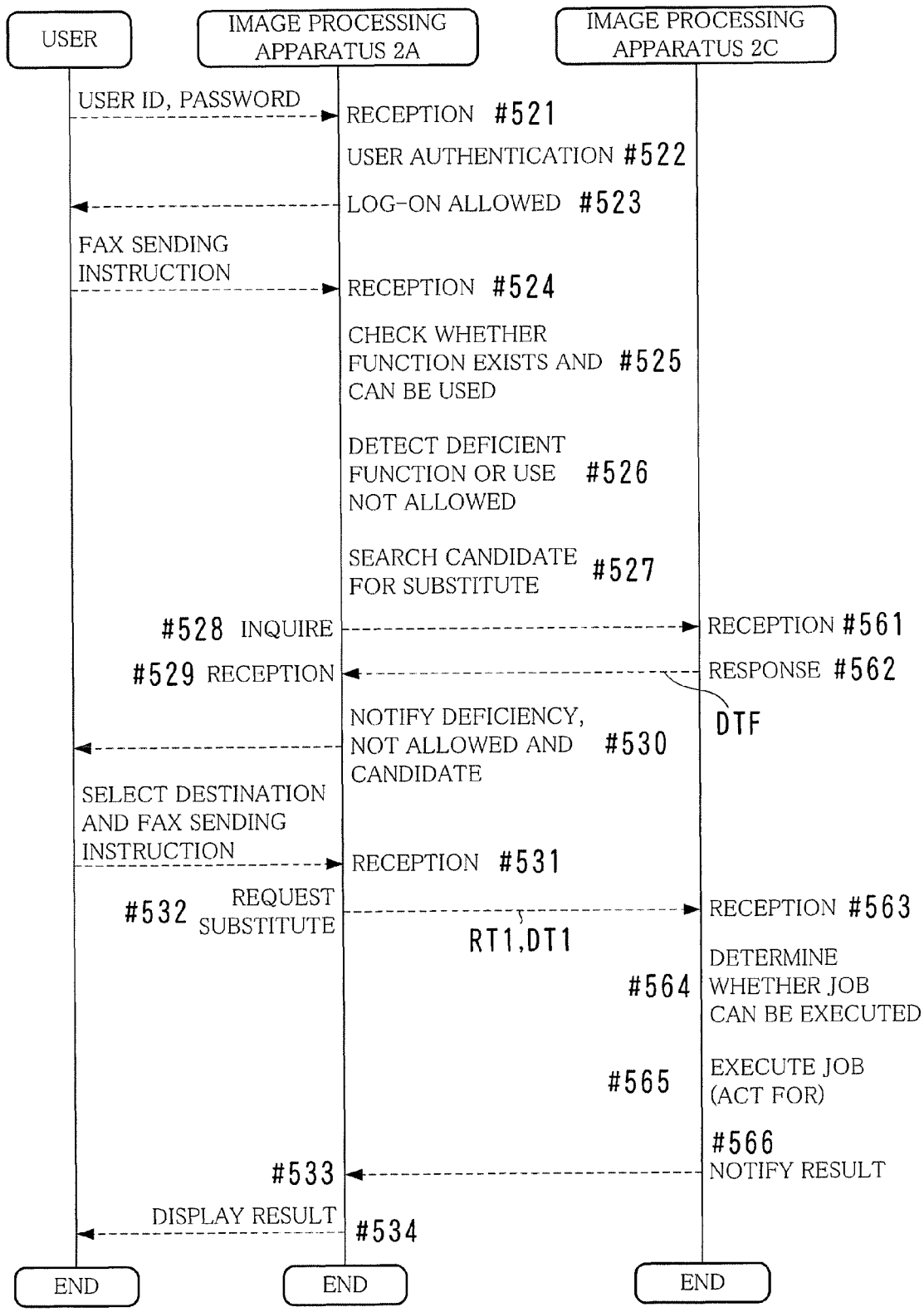
FIG. 12 is a flowchart illustrating a modification of a flow of a process to substitute a job.

If it is necessary for a different image processing apparatus 2 to act for the job to send data to a device (a destination) that is outside of the network system 1, such as a job to send a fax, the job can be processed to apply Rule C, in other words, to reflect the agreement of the apparatus for the substitution on the destination side, prior to requesting the substitute. Procedures for substituting will now be explained with reference to FIG. 12 using an example of the user X requesting an image processing apparatus 2C in which agreements are made to prohibit direct input of a destination (that is to input an address or fax number that is not registered in an address book or telephone directory) to act to send a fax.

Figure 11:
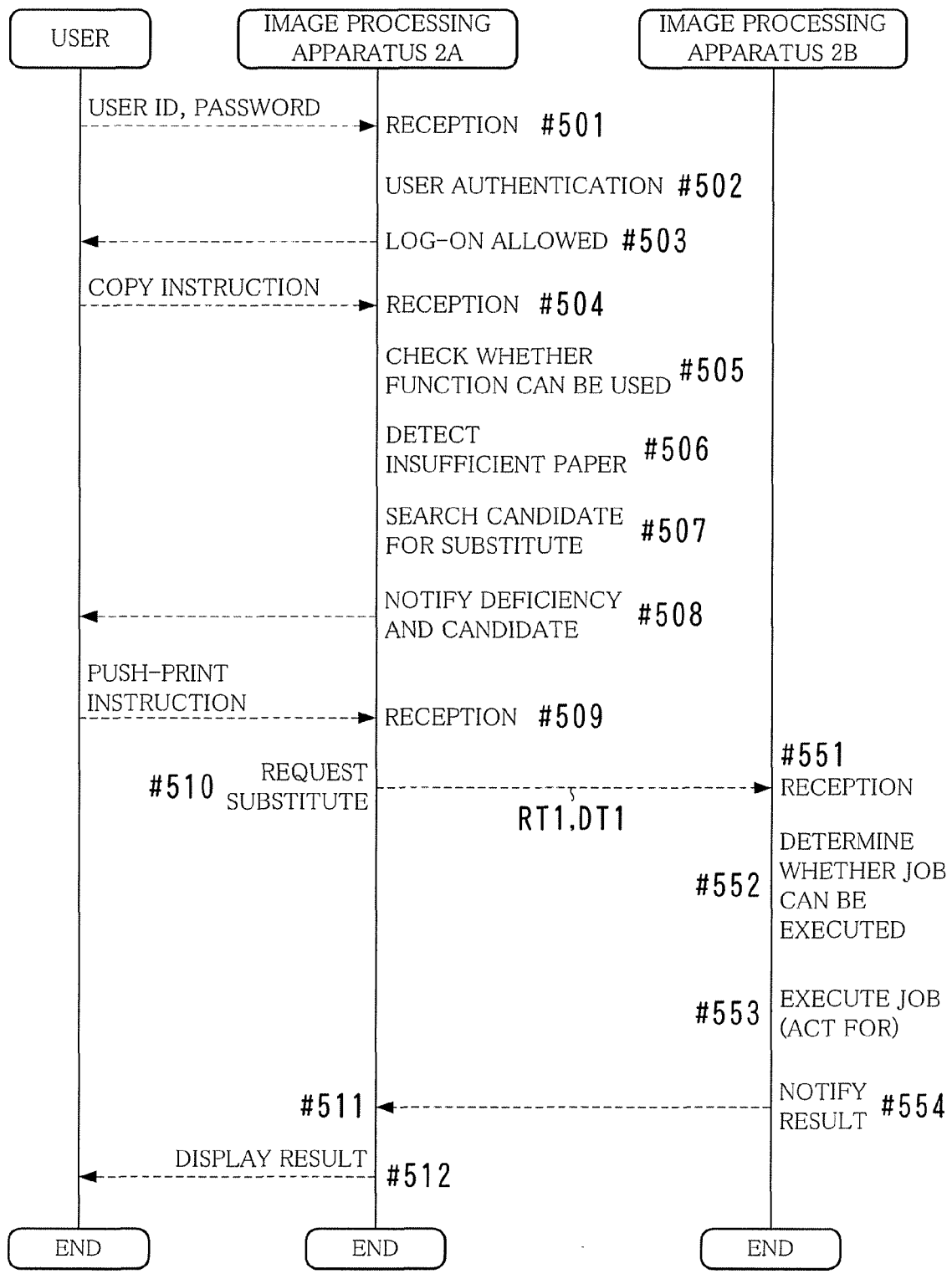
FIG. 11 is a flowchart illustrating an example of a flow of a process to substitute a job.

The image processing apparatus 2A performs a user authentication process, in the same way as steps #501 to #503 shown in FIG. 11, based on the user X's input ID and password (#521 to #523).

When the image processing apparatus 2A receives the job to send a fax of an original image from the user X (#524), it checks whether that function for executing the job (the function to send the fax) is provided in that image processing apparatus 2A, and whether that function is currently usable (#525).

If it is detected in the result of that check that the fax sending function is not provided, or that it cannot be used (#526), the image processing apparatus 2A searches other image processing apparatuses 2 that share that function and currently can provide that function (#527).

If the image processing apparatus 2C is found in the results of the search as the image processing apparatus 2 that shares the fax sending function and that function currently is provided, the image processing apparatus 2A requests the image processing apparatus 2C to send information on arrangement of the restrictions of functions (#528).

The image processing apparatus 2C responds with respect to the restrictions of functions to the image processing apparatus 2A (#562) when the image processing apparatus 2C receives the request from the image processing apparatus 2A (#561). In this example, the image processing apparatus 2C sends a data list DTF of fax numbers registered in the image processing apparatus 2C address book or telephone directory, along with a response that direct input of a destination is prohibited to the image processing apparatus 2A.

Then, when the image processing apparatus 2A receives the response that direct destination input is prohibited and the data list DTF from the image processing apparatus 2C (#529), it displays a destination selection screen HG2 that has a message to the effect that the fax sending function is not provided, or that it is currently not usable, a message that it is possible to substitute the image processing apparatus 2C to act to send the fax, and a list of fax numbers indicated in the data list DTF, as shown in FIG. 13 (#530). A text box for directly inputting a destination is not provided in the destination selection screen HG2. Here, the user X selects the fax number of the destination to send the fax.

When the image processing apparatus 2A receives the fax number selection (#531), it acquires the image data by scanning the original, and sends the image data and data indicating the fax number selected by the user X as the request information RT to request substituting the fax sending job (#532). Also, the image processing apparatus 2A sends the user X's restricted functions information DT1 (see FIG. 4) along with the request information RT to the image processing apparatus 2C.

The image processing apparatus 2C determines whether to execute the requested job, and acts for the job if it can be executed, and sends the execution result to the image processing apparatus 2A (#563 to #566), basically in the same way as was described in the steps #551 to 554 for FIG. 11. However, because the destination is selected by the destination selection screen HG2, it is clear that the Rule C has already been applied. Therefore, it is not necessary to determine whether Rule C has been satisfied. With regard to Rule B, if it is not necessary to be applied, then it is not necessary to determine whether it has been satisfied.

When the image processing apparatus 2A receives the execution result of the job from the image processing apparatus 2C, the image processing apparatus 2A displays that for the user X (#533, and #534), in the same way as was described for steps #511 and 512 in FIG. 11. The image processing apparatus 2 that was requested by the user to substitute the job can apply charges to the user or to the section to which the user belongs as a usage fee generated by executing that job.

If charges cannot be made, or if there is no system for managing such charges, that substituting apparatus would bear the costs for usage by users who are not home users, which is unfair.

If charges were not made because of some problem or because they were not being managed, it is determined whether it is acceptable to act for that job based on an agreement at the requested image processing apparatus 2.

For example, if there is an agreement that the requester of the substitution is handled as a guest user, it is determined whether that job can be executed based on the guest restricted functions information DTG at the requested image processing apparatus 2. Or, if there is an agreement to restrict usable functions when substituting, it is determined that it is possible to act only for executable jobs that are within that range.

If charges for costs can be made, it is determined whether it is acceptable to act for the job, based on Rule A to Rule C, as described above.

Note that if the job indicated in the request information RT is to send data to a device outside of the network system 1, even if it is possible to charge costs, the job will observe the agreement relating to the sending of the data to the external device on the requested image processing apparatus 2, as described in the present embodiment.

The present embodiment described an example of handling a job from a user that directly operates an image processing apparatus 2. However, it should be noted that the present invention could also apply to handling a job remotely specified by a user by operating a personal computer.

Furthermore, the embodiment described above used an example of an MFP as the image processing apparatus of the present invention. However, the present invention can apply to other image processing apparatuses such as a copier, printer or fax machine and the like.

It should also be noted that all or a part of the configuration of the network system 1 and image processing apparatus 2, the contents of the processes thereof, their processing order, and the configuration of data such as the restricted functions information DT1 can be changed and still remain within the scope and spirit of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An image forming system comprising a first image forming apparatus and a second image forming apparatus each of which has a function to execute an image-related process relating to an image,
   wherein the first image forming apparatus capable of executing at least one of copying, scanning and printing functions includes
   a memory device that stores usage right information of each user relating to a right to use the function of the first image forming apparatus, and
   a request portion that makes a request to the second image forming apparatus to execute the image-related process specified by a user whose usage right information is stored on the memory device, and
   the second image forming apparatus includes
   a receiver that receives the request, an acquisition portion that acquires from the first image forming apparatus that is a requester the usage right information of the user relating to the request received by the receiver,
a determining portion that determines whether the user relating to the request has a usage right of the function necessary to execute the image-related process concerning the request based on the acquired usage right information, and
a controller that controls each portion of the second image forming apparatus to execute the image-related process when it is determined by the determining portion that the user concerning the request has a right to use the function necessary to execute the image-related process, and not to execute the image-related process when it is determined that the user has no such right.

2. The image forming system according to claim 1, wherein the controller of the second image forming apparatus controls whether to execute a process relating to sending data to a device outside of a network including the first image forming apparatus and the second image forming apparatus following an arrangement of the second image forming apparatus relating to sending data to outside when the request received by the receiver is to execute the process.

3. The image forming system according to claim 1, wherein the controller of the second image forming apparatus controls whether to execute the image-related process concerning the request following an arrangement of the second image forming apparatus when it is not possible to charge the user relating to the request received by the receiver for a usage fee for the image-related process concerning the request.

4. The image forming system according to claim 1, wherein the first image forming apparatus further comprises an execution substitute need determining portion which determines whether the requested image-related process is able to be executed on the first image forming apparatus.

5. The image forming system according to claim 1, wherein the first image forming apparatus further comprises a candidate search portion which automatically searches other image forming apparatuses for candidates able to execute the requested image-related process, only if the execution substitute need determining portion determines that the requested image-related process cannot be executed on the first image forming apparatus.

6. The image forming system according to claim 1, wherein the first image forming apparatus is a Multi-Function Peripheral.

7. The image forming system according to claim 1, wherein the second image forming apparatus is a Multi-Function Peripheral.

8. An image forming apparatus having a function to execute an image-related process relating to an image, the image forming apparatus comprising:
a receiver that receives a request from another image forming apparatus to execute the image-related process, wherein the other image forming apparatus is capable of executing at least one of copying, scanning and printing functions;
an acquisition portion that acquires from the other image forming apparatus usage right information relating to a right of the user that specified the request to use the function;
a determining portion that determines whether the user has a usage right of the function necessary to execute the image-related process concerning the request based on the usage right information acquired by the acquisition portion; and
a controller that controls each portion of the image forming apparatus to execute the image-related process when it is determined by the determining portion that the user has a right to use the function necessary to execute the image-related process concerning the request, and not to execute the image-related process when it is determined that the user has no such right.

9. The image forming apparatus according to claim 8, wherein the controller controls whether to execute a process relating to sending data to a device outside of a predetermined network to which the image forming apparatus belongs following an arrangement relating to sending data to outside of the image forming apparatus when the request received by the receiver is to execute the process.

10. The image forming apparatus according to claim 8, wherein the controller controls whether to execute the image-related process concerning the request following an arrangement of the image forming apparatus when it is not possible to charge the user relating to the request received by the receiver for a usage fee for the image-related process concerning the request.

11. The image forming apparatus according to claim 8, wherein the image forming apparatus is a Multi-Function Peripheral.

12. A control method of an image forming apparatus having a function to execute an image-related process relating to an image, the control method letting the image forming apparatus perform the processes comprising:
receiving a request from a request portion of another image forming apparatus to execute an image-related process relating to an image;
acquiring from the other image forming apparatus usage right information of a user who specified the request relating to a right to use the function, wherein the other image forming apparatus is capable of executing at least one of copying, scanning and printing functions, wherein the other image forming apparatus includes a memory device that stores usage right information of each user relating to a right to use the function of the other image forming apparatus;
determining whether the user who specified the request has a right to use the function necessary to execute the image-related process relating to the request based on the acquired usage right information; and
executing the image-related process when it is determined that the user has a right to use the function necessary to execute the image-related process according to the request, and not executing the image-related process when it is determined that the user has no such right.

13. The control method according to claim 12, further comprising controlling whether to execute a process relating to sending data to a device outside of a predetermined network to which the image forming apparatus belongs following an arrangement relating to sending data to outside of the image forming apparatus when the request is to execute the process.

14. The control method according to claim 12, further comprising controlling whether to execute the image-related process following an arrangement of the image forming apparatus when it is not possible to charge the user relating to the request for a usage fee for the image-related process concerning the request.

15. The control method according to claim 12, wherein the image forming apparatus is a Multi-Function Peripheral, and the other image forming apparatus is a Multi-Function Peripheral.

16. A software program stored on a computer readable medium used in an image processing apparatus having a function to execute an image-related process relating to an image, the computer program letting the image processing apparatus execute:

a process for receiving a request from a request portion of another image forming apparatus to execute the image-related process, wherein the other image forming apparatus is capable of executing at least one of copying, scanning and printing function;

a process for acquiring from the other image forming apparatus usage right information of a user who specified the request relating to a right to use the function, wherein the other image forming apparatus includes a memory device that stores usage right information of each user relating to a right to use the function of the other image forming apparatus;

a process for determining based on the acquired usage right information whether the user who specified the request has a right to use the function necessary to execute the image-related process relating to the request; and a process for executing the image-related process when it is determined that the user has a right to use the function necessary to execute the image-related process according to the request.

17. The non-transitory computer readable medium according to claim 16, further controlling whether to execute the image-related process, the process relating to sending data to a device outside a predetermined network to which the image forming apparatus belongs, following an arrangement relating to sending data to outside of the image forming apparatus when the image-related process indicated in the request is the process.

18. The non-transitory computer readable medium according to claim 16, further controlling whether to execute the image-related process concerning the request following an arrangement of the image forming apparatus when it is not possible to charge the user relating to the request for a usage fee for the image-related process.

19. The non-transitory computer readable medium according to claim 16, wherein the image forming apparatus is a Multi-Function Peripheral, and the other image forming apparatus is a Multi-Function Peripheral.

* * * * *